United States Patent Office 3,398,981
Patented Aug. 27, 1968

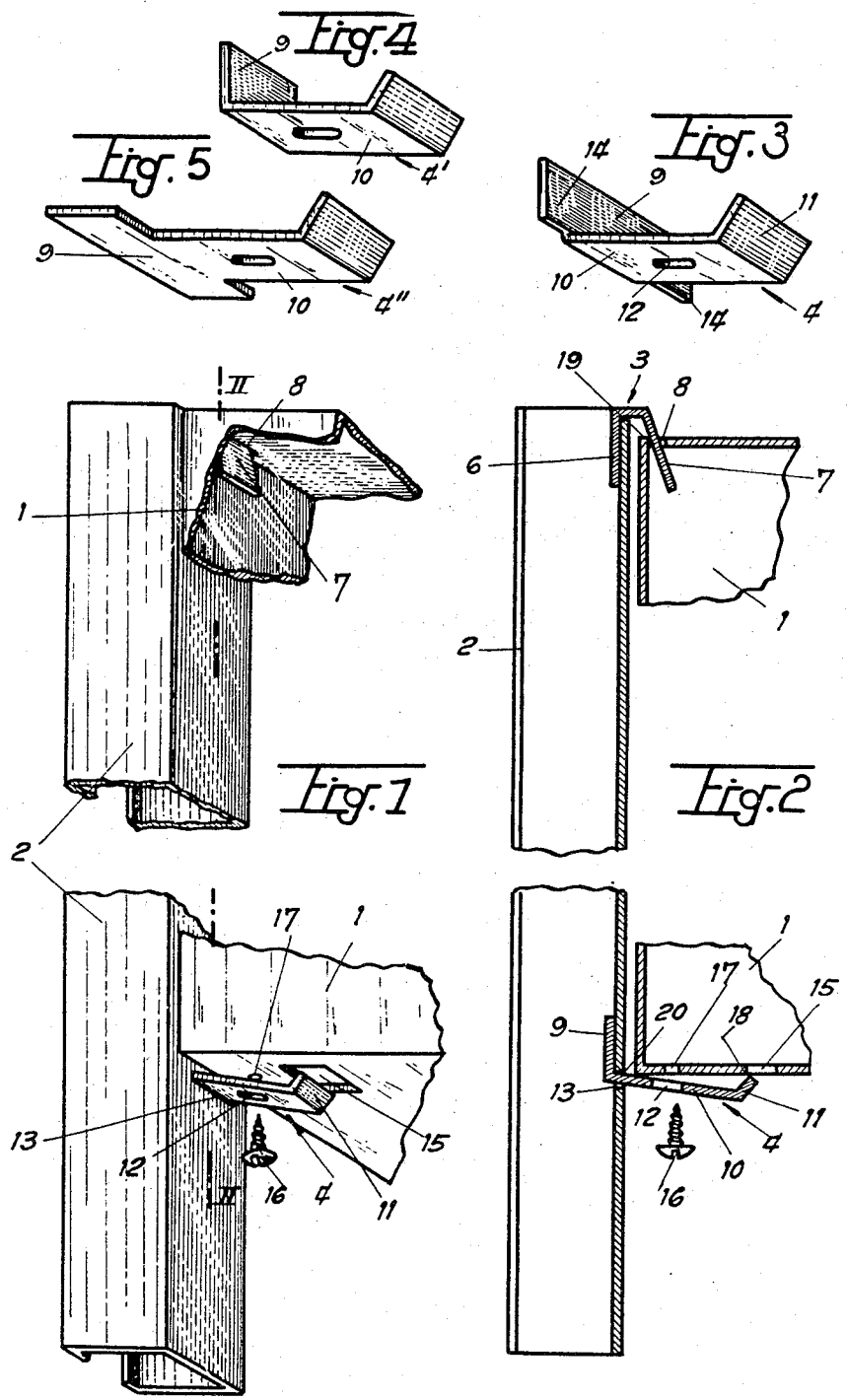

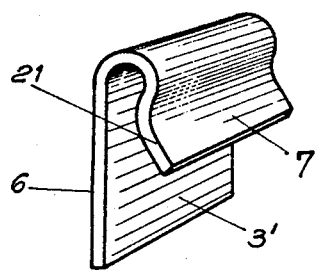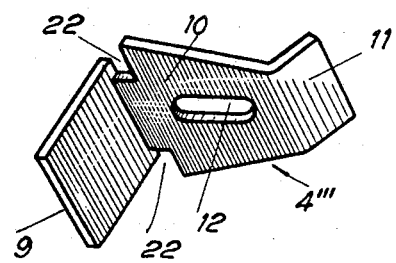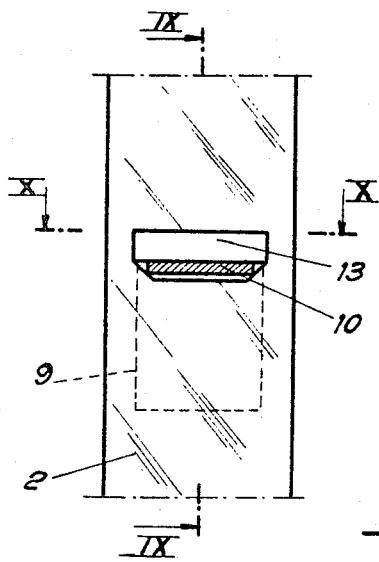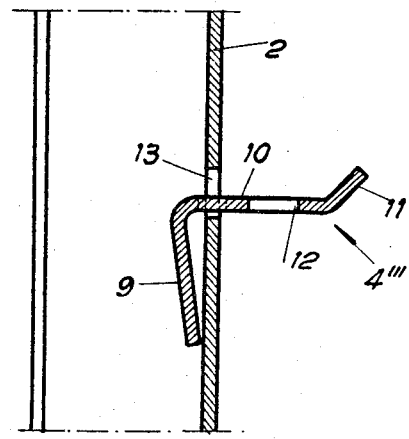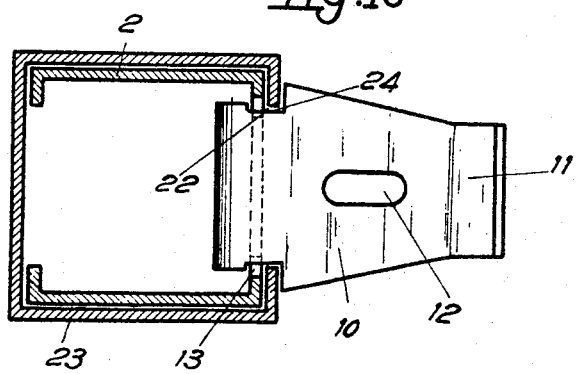

3,398,981
CONNECTING SYSTEM INCLUDING CLIP ELEMENTS
René Vincens, Ancourt, France, assignor to Societe Civile de Recherches et d'Etudes Industrielles, Neuville-les-Dieppe, Seine Maritime, France, a French company
Filed Oct. 12, 1966, Ser. No. 586,282
Claims priority, application France, Oct. 13, 1965, 3,226
12 Claims. (Cl. 287—189.35)

ABSTRACT OF THE DISCLOSURE

A connection, suitable for furniture construction, in which two hollow members, one horizontal and the other vertical are rigidly joined and which has no holes in the surface to mar its appearance. The vertical member has two vertically spaced openings in one side thereof, to permit the insertion, in the upper opening, of a clip which has a leg extending outwardly and downwardly through an opening in the top of the horizontal member, and the insertion, in the lower of the vertically spaced openings, of a clip having an outwardly and upwardly extending leg which projects through an opening in the bottom of the horizontal member, so that when a screw is threaded through the lower clip and the horizontal member to bring the lower clip upwardly against the horizontal member, the horizontal member is raised and its end is brought into contact with the side of the vertical member.

---

This invention relates to a system for connecting together two articles, particularly but not exclusively articles of unit furniture.

Practically all office furniture of recent design is made up from standard units assembled so that they can be taken apart and rearranged. This technique requires a thorough study of the means provided for joining the units together, if proper flexibility in the use of the units is to be assured and if it is to be possible for them to be assembled in the maximum number of combinations possible.

Assembly consists, in general, in bringing together the whole or part of one or more parallel faces of two units and securing them in such a way that they are rigidly attached to each other. For satisfactory securement, it is preferable to distribute the points of attachment all around the perimeter of the juxtaposed faces. When these faces are rectangular, it is generally recognised that a single point of attachment at each angle is sufficient to make a sound connection. When the rectangular faces juxtaposed are long and narrow, very good results can be obtained with only two connection points, situated in the shorter sides of the perimeter.

The parts to be fixed to each other are mostly secured with screws or bolts distributed and positioned on the units as already stated. Holes for the passage of these screws or bolts are made in each of the units to be joined together.

In the interest of a high degree of standardisation and to increase the assembly possibilities, it is very often necessary for each unit to be provided with a large number of holes. Not all of these holes, which are generally situated in the vertical faces of the units, are used in each form of assembly, so that some of the exposed surfaces are disfigured by them.

The presence of holes, moreover, prevents the furniture from being painted by the "dip" method, because they cause runs that are not in keeping with the finish desired.

The present invention consists of an improvement in unit furniture, whereby these drawbacks are at least partly eliminated.

According to the invention there is provided in a system for connecting together a first and a second article, a first clip having two limbs and a portion connecting said limbs, one of said limbs extending in a direction normal to the said portion and the other said limb being inclined at a diverging angle to the said one limb and extending from the same face of the connecting portion, a second clip having two limbs, and a portion connecting said limbs, one of said limbs extending at an angle more than a right angle to the connecting portion, means of the first said article defining a surface lying in one plane, said means having an edge for co-operation with said first clip and an adge for co-operation with said second clip, means of the second said article defining a first surface lying in a plane at an angle to said one plane, said means of the second article having an edge for cooperation with said inclined limb of the second clip, means defining a second surface of the said second article, said second surface having an edge for cooperation with the inclined limb of the first clip, and means for drawing the connecting portion of the second clip into at least close proximity with the first surface of the said second article, said articles being secured together with the surface of said first article in at least close proximity to said second article, by engagement of the first clip with said one limb thereof engaging over said edge of the said first article and said other limb thereof engaging over the said edge of the second surface of said second article, by engagement of said second clip with said inclined limb over the edge of the first surface of the said second article and with the other limb in the other edge of the said surface of the said first article, and by the action of said drawing means in forming the inclined limb of the second clip to engage fully over the corresponding edge.

Further according to the present invention there is provided in a system for securing together two articles, a first clip having an inclined surface cooperating with one said article a second clip having an inclined surface cooperating with said one article, and means for drawing the second clip into engagement with the said one article when the clips are in cooperating positions whereby the inclined surfaces act to draw the articles together and secure them in their final relative positions.

Thanks to the invention, there are no longer any holes visible from the outside of the joint, although the unit assembly is as sturdy as if it had been carried out in the usual way, that is by bolting or screwing. The furniture units or other articles can be "dip" painted; it is also possible to assemble two units that are completely inaccessible from outside. Moreover, any forces tending to separate the assembly and transmitted laterally are broken down by the inclined limbs or surfaces, which act as wedges; hence, the stronger the forces applied, the more tightly do the clips grip the units.

The two furniture units to be assembled in accordance with the invention may be of any kind, such as, for example, desk units, pedestals, filing cabinets or partitions.

When one of the units or other articles normally has no edge in the plane of assembly, an aperture can be made in this unit to receive the inclined limb or surface, which then bears against that side of the aperture which lies nearest to the plane of assembly.

The aperture may also be made in a part added to the unit, consisting, for instance, of a short length of angle iron fixed to the unit.

Various embodiments of the system in accordance with the invention will now be described by way of example, with reference to the accompanying diagrammatic drawings, in which:

FIGURE 1 is a partly cut-away perspective view from below, of one corner of a furniture unit and the adjacent leg;

FIGURE 2 is a cross-section along the line II—II in FIGURE 1;

FIGURES 3 to 5 are perspective drawings of clips of various kinds;

FIGURE 6 is a perspective view of another form of one of the clips made in accordance with the concept of the invention;

FIGURE 7 is a perspective view of still another form of clip made in accordance with the concept of the invention;

FIGURES 8 and 9 show the clip of FIGURE 7 mounted on a foot of a piece of furniture, the foot being shown respectively in elevation and in section along the line IX—IX of FIGURE 8; and FIGURE 10 is a section along the line X—X of FIGURE 8, an embellishment being arranged on the foot.

The drawings show a piece of furniture comprising a unit 1 and a leg 2, which are here made of sheet metal, the leg 2 consisting of a length of box-sectioned tubing open down one side. These two parts are joined together by first or top clip 3 and second or bottom clip 4.

The top clip 3 is shaped like a V with a truncated base, the inside width of this base being substantially equal to the sum of the thicknesses of the leg wall and the side of the unit 1.

The base of the clip 3 bears against the end of the leg 2. This clip has one limb 6, welded to the inner face of the tube; the other limb 7, which is at a slight angle diverging from the adjacent vertical face of the leg 2 and thus forms a hook, is inserted through an aperture 8, in the top surface of the unit 1. This aperture is not visible once the piece of furniture is assembled, as the unit will generally have a top or cover plate (not shown).

The bottom clip 4 is formed from a piece of T-shaped sheet material. One limb 9, of this clip is bent almost at right angles to protion 10, and a limb 11 of the latter is bent at about 60° in the same sense as the limb 9 (FIGURE 3). An elongate aperture 12, is provided in the portion 10.

The portion 10 of the clip 4 passes through an aperture 13 in the leg 2, the distance of this aperture from the top end of this leg being substantially equal to the depth of the unit 1. This aperture is made necessary by the contribution of the leg 2, but it would naturally not exist if the two members being assembled were level with each other at the bottom, as they are at the top.

In the example illustrated, there is no problem in fitting the clip 4 to the leg 2, this leg being open along the side opposite aperture 13. In the case of a closed tube, a clip such as 4' (FIGURE 4) could be used, in which the limb 9 is of the same width as the portion 10. However, the shoulders formed by ends 14 of this limb 9 in the embodiment shown in FIGURE 3 are very useful, because they increase the rigidity of the assembly by holding the leg 2 across its entire internal width, as will be seen later. Alternatively, a clip such as 4" (FIGURE 5) might be used, in which the limb 9 and the portion 10 are not bent in relation to each other, the aperture 13 being replaced by a "button-hole" to enable the clip to be inserted and given a quarter-turn.

The limb 9 of the clip 4 rests flat against the inner surface of the leg 2, to which it may, but need not, be welded. The underside of the unit 1 also contains an aperture 15, to receive the inclined or turned-up end 11, of the clip. Finally, a screw 16, which passes through elongate hole 12 in the clip 4, can be screwed into hole 17 in the underside of the unit.

The leg 2 is fitted to the unit 1 while both are turned upside down. The limb 7 is first introduced into the opening 8 in the unit. To enable this to be done, the two members, leg and unit, should be disposed so as to bring the limb 7 and the opening 8 into alignment. This first step having been carried out and the limb 7 being properly engaged, the leg 2 is swung into position flat against the face of unit 1, the base of the clip 3 being used as a pivot. The turned-up end or inclined limb 11, of the clip 4 then comes opposite aperture 15, scarcely getting in the way of or catching on the corner of the unit, because of the wide angle between clip portion 10 and the leg. The screw 16 is thereupon fitted and screwed into the hole 17.

As the screw 16 is tightened, the portion 10 of the clip 4 is caused to swing so that its inclined limb 11, which forms a ramp, bears against edge 18 of the aperture 15. As tightening proceeds, this ramp is driven to the right and tends to pull the lower part of leg 2 up against the side of the unit. At the same time, the leg 2 is forced towards the bottom of the unit, so that the leg 7 of the clip 3 also forms a ramp and bears against edge 19 of the opening 8; the top of the leg 2 is thus also drawn flat against the side of the unit. In this way, the clips 3 and 4 act to some extent as a pair of pincers, with the jaws gripping the sides of the units or other articles to be joined. The slightly oval shape of the hole 12 in the portion 10 of the clip 4 enables this arm to slide on the unit as the screw 16 is tightened.

The measurement between the edge 20 of the aperture 13 and the inside angle of the inclined limb 11 is substantially equal to or even slightly less than that between the outer face of the side of the unit and the edge 18 of the aperture 15. With screw 16 fully home, the leg 2 lies flat against the side of the unit 1.

Should this measurement be slightly less, the portion 10 of clip 4 will not be brought flat against the underside of the unit 1, so that the more the screw is tightened, the harder the leg 2 will be held to the unit.

If desired, some thin member may be interposed between the unit 1 and the leg 2, without thereby affecting the quality or ease of assembly. Such a member might form part of a detachable embellishment, for example, or of a further member it is desired to assemble with the leg or the unit.

In FIGURE 6, the clip 3' has the form of a claw; to this end, the limb 7, which forms a ramp or inclined surface, is connected to the limb 6 by a curved portion 21 of which the concave face lies inwardly, the distance between this curved portion and the limb 7 being slightly less than the sum of the thicknesses of the leg 2 and of the unit 1. The wall of the leg is thus locked to the box and it is not necessary to weld the clamp to the foot as was necessary with the clip 3.

FIGURES 7 to 10 show a clip 4''' which is similar in its overall form to the clip 4 but the limb 9 of the clip is bent in the opposite sense to the limb 11 forming the ramp. Owing to this arrangement, the limb 9 is strongly forced against the internal face of the leg 2 when it is locked by the screw 16.

Moreover, the portion 20 of the clip 4''' has a trapezoidal form and the leg line has a width less than the maximum width of the portion 10; two indents 22 are formed in the clip at the junction between the limb 9 and the portion 10, and the portion 10 therefore has a rectangular section as well as a trapezoidal section.

The opening 13 in the leg 2 includes a rectangular portion of which the width is slightly larger than that of the limb 9 of the clip; below this rectangular portion there is a trapezoidal portion of which the minimum width is less than the width of the clip between the two indents 22. The engagement of the clip in the opening is thus very easy and before locking by the screw 16, the clip beds down in the opening 13, which assists in the assembly.

After the introduction of the clip 4''', it is possible to place on the leg 2 an embellishment 23 provided in its rear face with a longitudinal opening 24, of which the width is between the width of the clip between the indents 22 and the width of the limb 9. The edges of the opening in the embellishment can thus engage in the indents 22 and, when the embellishment is in place, the clip 4''', cannot be withdrawn.

The invention should naturally not be regarded as limited to the example described and illustrated, but includes all variants thereof within its scope. Thus, for instance, the clips 3 and 4 might both be welded to unit 1 or, on the contrary, both independent of it. Similarly, both clips might be provided with securing screws.

I claim:
1. In a system for connecting together a first and a second article,
   a first clip having two limbs and a portion connecting said limbs,
   one of said limbs extending in a direction normal to the said portion and the other said limb being inclined at a diverging angle to the said one limb and extending from the same face of the connecting portion,
   a second clip having two limbs, and a portion connecting said limbs,
   one of said limbs extending at an angle more than a right angle to the connecting portion,
   means of the first said article defining a surface lying in one plane, said means having an edge for co-operation with said first clip and an edge for co-operation with said second clip,
   means of the second said article defining a first surface lying in a plane at an angle to said one plane, said means of the second article having an edge for cooperation with said inclined limb of the second clip,
   means defining a second surface of the said second article, said second surface having an edge for co-operation with the inclined limb of the first clip, and
   means for drawing the connecting portion of the second clip into at least close proximity with the first surface of the said second article, said articles being secured together with the surface of said first article in at least close proximity to said second article by engagement of the first clip with said one limb thereof engaging over said edge of the said first article and said other limb thereof engaging over the said edge of the second surface of said second article, by engagement of said second clip with said inclined limb over the edge of the first surface of the said second article and with the other limb in the other edge of the said surface of the said first article, and by the action of said drawing means in forming the inclined limb of the second clip to engage fully over the corresponding edge.

2. A system according to claim 1, wherein the connecting portion of the first clip is curved.

3. A system according to claim 1, wherein both said clips are of sheet metal.

4. A system according to claim 1, wherein said drawing means is a screw-threaded member.

5. A system according to claim 1, wherein the other limb of the second clip extends normally to the connecting portion and from the same face as the inclined limb.

6. A system according to claim 1, wherein the other limb of the second clip has a larger transverse dimension than the connecting portion.

7. A system according to claim 1, wherein the connecting portion has a slot therein.

8. A system according to claim 1, wherein the connecting portion of the second clip comprises
   a trapezoidal section and
   a rectangular section,
   the shorter parallel side of the trapezoidal section being contiguous with the inclined limb, and the rectangular section having a smaller transverse dimension than the longer side of the trapezoidal section and serving as a short tongue interconnecting said other limb and the longer side of the trapezoidal section.

9. A system according to claim 8, wherein the one limb extends from the connecting portion in the opposite sense to the other limb.

10. A system according to claim 8, wherein the opening in the first article is larger than the cross-section of the other limb of the second clip but smaller than the largest cross-section of the trapezoidal section.

11. A system according to claim 8, further comprising embellishment means which engage over the first article, said embellishment means including
    portions which extend into a space between the other limb of the second clip and parts of the longer side of the trapezoidal section of the second clip.

12. A system according to claim 1, wherein said first article is a box-section member with a longitudinal opening in the side opposite said aperture.

References Cited
UNITED STATES PATENTS

| | | | |
|---|---|---|---|
| 1,714,236 | 5/1929 | Peer | 248—223 |
| 2,213,115 | 8/1940 | Bales | 248—243 |
| 2,721,632 | 10/1955 | Surpierre | 287—189.36 |
| 3,282,006 | 11/1966 | Halsey et al. | 287—189.36 |

FOREIGN PATENTS 611,308    3/1935    Germany.

CARL W. TOMLIN, *Primary Examiner.*

R. S. BRITTS, *Assistant Examiner.*